US008470413B2

(12) United States Patent
Kim et al.

(10) Patent No.: US 8,470,413 B2
(45) Date of Patent: Jun. 25, 2013

(54) RETARDATION COMPENSATORS OF NEGATIVE C-TYPE FOR LIQUID CRYSTAL DISPLAY

(75) Inventors: Hee-Jung Kim, Daejeon (KR); Dong-Ryul Kim, Daejeon (KR); Ho-Jun Lee, Daejeon (KR); Sang-Uk Ryu, Daejeon (KR); Hyo-Sun Lee, Daejeon (KR); Boong-Goon Jeong, Daejeon (KR); Dae-Woo Nam, Daejeon (KR); Ju-Eun Cha, Daegu (KR)

(73) Assignee: LG Chem, Ltd., Seoul (KR)

( * ) Notice: Subject to any disclaimer, the term of this patent is extended or adjusted under 35 U.S.C. 154(b) by 513 days.

(21) Appl. No.: 12/087,739

(22) PCT Filed: Jan. 11, 2007

(86) PCT No.: PCT/KR2007/000205
§ 371 (c)(1),
(2), (4) Date: Jul. 14, 2008

(87) PCT Pub. No.: WO2007/081168
PCT Pub. Date: Jul. 19, 2007

(65) Prior Publication Data
US 2009/0002613 A1    Jan. 1, 2009

(30) Foreign Application Priority Data
Jan. 13, 2006   (KR) .................. 10-2006-0003882

(51) Int. Cl.
*C09K 19/00*   (2006.01)
(52) U.S. Cl.
USPC ............ 428/1.33; 428/1.1; 428/1.3; 349/117; 349/118; 349/120; 264/1.34; 525/470

(58) Field of Classification Search
USPC ................ 428/1.33, 411, 412, 416, 522, 523, 428/337, 1.1, 1.3; 349/117, 118, 119, 120, 349/121; 525/466, 468, 470, 490, 501.5, 525/534; 264/1.34
See application file for complete search history.

(56) References Cited

U.S. PATENT DOCUMENTS
4,379,892 A * 4/1983 Ueno et al. .................... 525/439
5,322,715 A   6/1994 Jouck et al.
(Continued)

FOREIGN PATENT DOCUMENTS
JP    6-174923 A    6/1994
JP    2002-48919 A  2/2002
(Continued)

OTHER PUBLICATIONS
Machine Translation of JP 2003-313491.*

*Primary Examiner* — Gwendolyn Blackwell
*Assistant Examiner* — Ruiyun Zhang
(74) *Attorney, Agent, or Firm* — McKenna, Long & Aldridge, LLP

(57) ABSTRACT

Disclosed is a negative C-type retardation compensator for a liquid crystal display. The negative C-type retardation compensator for the liquid crystal display includes polyarylate having a thio group or a sulfur oxide group in a polymer main chain thereof. Accordingly, the retardation compensator has an absolute value of negative retardation that is larger in a thickness direction than a retardation compensator which includes polyarylate having no thio group or sulfur oxide group in a polymer main chain thereof even though the retardation compensator having the thio group or sulfur oxide group and the retardation compensator having no thio group or sulfur oxide group are the same as each other in thickness. Thereby, the negative C-type retardation compensator for liquid crystal displays is capable of being desirably applied to the liquid crystal displays.

9 Claims, 1 Drawing Sheet

U.S. PATENT DOCUMENTS

| | | | |
|---|---|---|---|
| 5,580,950 A * | 12/1996 | Harris et al. | 528/350 |
| 5,691,093 A | 11/1997 | Kanbayashi et al. | |
| 6,329,465 B1 | 12/2001 | Takahashi et al. | |
| 7,402,650 B2 * | 7/2008 | Kim et al. | 528/179 |
| 2007/0059456 A1 * | 3/2007 | Lee et al. | 428/1.3 |

FOREIGN PATENT DOCUMENTS

| | | |
|---|---|---|
| KR | 10-2005-0004439 | 1/2005 |
| WO | WO 2004/049011 A2 | 6/2004 |
| WO | WO 2006/033554 A1 | 3/2006 |

* cited by examiner

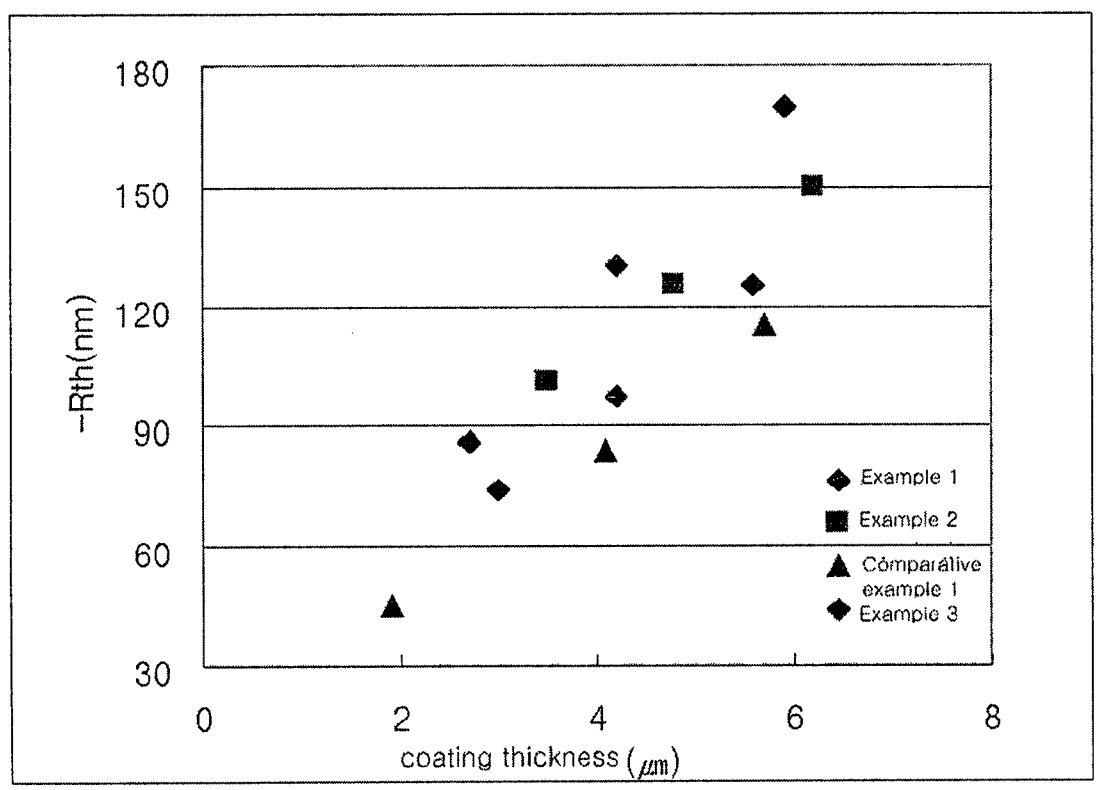

RETARDATION COMPENSATORS OF NEGATIVE C-TYPE FOR LIQUID CRYSTAL DISPLAY

This application claims the benefit of Korean Patent Application No. 10-2006-0003882, filed on Jan. 13, 2006 and PCT Application No. PCT/KR2007/000205, filed on Jan. 11, 2007, which is hereby incorporated by reference for all purposes as if fully set forth herein.

TECHNICAL FIELD

The present invention relates to a negative C-type retardation compensator for liquid crystal displays.

BACKGROUND ART

Generally, in a liquid crystal display, liquid crystal is injected between two substrates on which electrodes are formed, and the amount of voltage that is applied to the electrodes is controlled to adjust the amount of transmitted light.

The liquid crystal molecules have the anisotropic property, and the anisotropic property of liquid cells or films that include the molecules depends on how the liquid crystal molecules are distributed and an inclination angle of the molecules in respect to the substrate. Accordingly, in the case of the liquid crystal display, the amount and the color of light depends on the viewing angle.

Since the most liquid crystal molecules have the positive retardation in a thickness direction of the liquid crystal display surface, it is required that retardation compensator which has almost the same birefringence as the liquid crystal and the negative retardation is used to compensate the viewing angle.

In order to produce the retardation compensator that has the negative retardation in the thickness direction, 1) a process of stretching a film, and 2) a process of applying a substance having the birefringence are used. Currently, most retardation compensator is produced using the stretching process. However, since a stretching ratio is mechanically controlled, it is not easy to desirably control the angle, and the polarizing plates must be attached one by one while rolls are not used during the attachment by means of the polarizing plates. Accordingly, efficiency of the process is poor and it is difficult to control impurities.

Therefore, in order to avoid the above-mentioned disadvantages, a process of applying a substance having the birefringence on a surface of a film to produce a compensator is suggested. Korean Patent Application No. 10-2005-4439 discloses a process of applying liquid crystal having the birefringence. However, since the birefringence of the liquid crystal is very high, the retardation of the compensator is significantly changed even though the alignment of the liquid crystal and the thickness of the coat are slightly changed. Accordingly, it is difficult to control the retardation. In addition, as the area of the display is increased, it is difficult to ensure the clear color.

DISCLOSURE

Technical Problem

Therefore, the present inventors have conducted studies into a compensator in which a retardation is easily controlled, resulting in the finding that a retardation compensator which includes polyarylate having a thio group or a sulfur oxide group in a polymer main chain has a larger absolute value of a negative retardation in a thickness direction, as compared to a known polyarylate retardation compensator, even though the compensators have the same thickness, thereby accomplishing the present invention.

It is an object of the present invention to provide a negative C-type retardation compensator for a liquid crystal display that includes a polyarylate coating layer, and a liquid crystal display including the same.

It is another object of the present invention to provide a method of producing a negative C-type retardation compensator for a liquid crystal display that includes a polyarylate coating layer.

Technical Solution

The present invention provides a negative C-type retardation compensator for a liquid crystal display comprising 1) a transparent base layer, and 2) a polyarylate coating layer which is layered on the transparent base layer and has a thio group or a sulfur oxide group in a polymer main chain thereof. In the polyarylate coating layer, a retardation in a thickness direction which is defined by Equation 1 is negative, and an absolute value of the retardation is 10 nm or more.

$$R_{th} = \left(n_z - \frac{n_x + n_y}{2}\right) \times d \qquad \text{[Equation 1]}$$

Wherein, $n_x$ is a refractive index which is highest in a surface direction of the coating layer, $n_y$ is the refractive index of the direction perpendicular to the direction of $n_x$ in the surface direction of the coating layer, $n_z$ is the refractive index of the direction perpendicular to an $n_{xy}$ plane, and d is a thickness of the coating layer.

Furthermore, the present invention provides a method of producing a negative C-type retardation compensator for a liquid crystal display. The method comprises the steps of 1) preparing a transparent base layer, and 2) forming a polyarylate coating layer by applying a polyarylate solution having a thio group or a sulfur oxide group in a polymer main chain thereof on the transparent base layer of step 1.

The present invention will be described in detail hereinafter.

The present invention provides a negative C-type retardation compensator for a liquid crystal display, comprising 1) a transparent base layer, and 2) a polyarylate coating layer which is layered on the transparent base layer and has a thio group or a sulfur oxide group in a polymer main chain thereof. In the polyarylate coating layer, a retardation in a thickness direction which is defined by Equation 1 is negative, and an absolute value of the retardation is 10 nm or more.

In the negative C-type retardation compensator for the liquid crystal display according to the present invention, in order to ensure a retardation compensation effect, the thio group or the sulfur oxide group is introduced to polyarylate, and the resulting polyarylate is directly applied on the transparent base while an additional film is not produced. Thereby, the negative C-type retardation compensator can be simply produced. Furthermore, the thickness of the polyarylate coating layer may be simply controlled to ensure various retardations. In addition, in the present invention, since the stretching process is not performed unlike the known method of producing film using the stretching, the desired retardation in the thickness direction, that is, the negative retardation having the absolute value of 10 nm or more, may be obtained.

The polyarylate having the thio group or the sulfur oxide group in the polymer main chain may be represented by the following Formula 1.

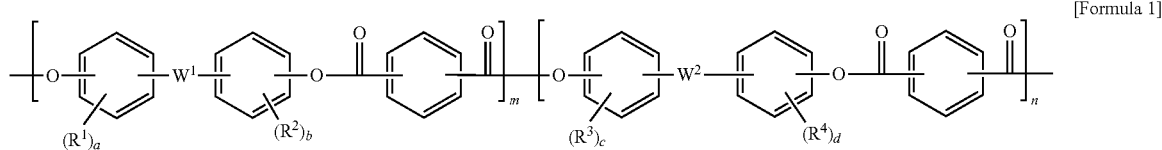

[Formula 1]

wherein, a, b, c, and d are each independently an integer of 0, or 1 to 4, m and n are molar fractions, m+n=1, $0 \leq m \leq 1$, $0 \leq n \leq 1$ $R^1$, $R^2$, $R^3$, and $R^4$ are each independently a halogen, a nitrile group, a $C_1$ to $C_{12}$ alkyl group, a $C_1$ to $C_{12}$ alkoxy group, a $C_6$ to $C_{12}$ arylalkyl group, a $C_6$ to $C_{12}$ aryl group, or a $C_1$ to $C_{12}$ acyl group, $W^1$ is a direct bond, a $C_1$ to $C_{30}$ alkylidene group, a $C_2$ to $C_{30}$ alkylene group, a $C_3$ to $C_{30}$ cycloalkylidene group, a $C_3$ to $C_{30}$ cycloalkylene group, a $C_2$ to $C_{30}$ phenyl-substituted alkylene group, a carbonyl group, NR, $PO_2$, an oxygen, a thio group, a sulfinyl group, or a sulfonyl group, wherein R is a hydrogen, a $C_1$ to $C_{12}$ alkyl group, a $C_6$ to $C_{12}$ arylalkyl group, or a $C_6$ to $C_{12}$ aryl group, $W^2$ is a thio group or a sulfur oxide group, and when n is 0, $W^1$ is a thio group, a sulfinyl group, or a sulfonyl group.

In the above-mentioned Formula 1, it is preferable that $W^2$ be the thio group, the sulfinyl group, or the sulfonyl group.

Monomers having the thio group or the sulfur oxide group are introduced to the polyarylate that is applied to the retardation compensator of the present invention so as to ensure a compensation effect.

A polyarylate is a linear aromatic polyester resin that is produced by polycondensating aromatic diol and aromatic dicarboxylic acid, or aromatic diol and aromatic dicarboxylic acid halide. The polyarylate resin may have various types of molecular structure according to the type of raw material. For example, the polyarylate resin is produced by polycondensating bisphenol A and terephthalic acid or isophthalic acid, which is divalent phenol and aromatic dicarboxylic acid, respectively. Since the polyarylate resin is an engineering plastic resin having specific physical properties and is transparent and has the high birefringence, the polyarylate resin may be applied to the retardation compensator of the liquid crystal display.

Examples of the aromatic dicarboxylic acid or the aromatic dicarboxylic acid halide include, but are not limited to terephthalic acid, isophthalic acid, dibenzoic acid, naphthalene dicarboxylic acid, 4,4'-methylenebisbenzoic acid, 1,2-bis(4-hydroxycarbonylphenyl)ethane, 2,2-bis(4-hydroxycarbonylphenyl)propane, 4,4'-oxo-bis(benzoic acid), bis(4-hydroxycarbonylphenyl)sulfide, bis(4-hydroxycarbonylphenyl)sulfone, aromatic dicarboxylic acid in which aromatic groups thereof are substituted with a $C_1$ to $C_2$ alkyl group or a halogen group, and a mixture thereof. It is preferable that the aromatic dicarboxylic acid includes 10 to 90 mol % of terephthalic acid halide and 90 to 10 mol % of isophthalic acid halide.

The aromatic diol is bis(4-hydroxyaryl)alkane, and may include one or more selected from the group consisting of bis(4-hydroxyphenyl)methane, 2,2-bis(4-hydroxyphenyl) propane (BPA), 2,2-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl) propane, 2,2-bis(4-hydroxy-3,5-dibromophenyl)propane, bis (4-hydroxyphenyl)phenylmethane, 4,4-dihydroxyphenyl-1, 1-m-diisopropylbenzene, 4,4-dihydroxyphenyl-9,9-fluorene, 2,2-bis(4-hydroxyphenyl)fluorene (BHPF), 9,9-bis (3,5-dimethyl-4-hydroxyphenyl)fluorene (BDMPF), and 9,9-bis(3,5-dibromo-4-hydroxyphenyl)fluorene (BFBPF).

Furthermore, the aromatic diol may be bis(hydroxyaryl) cyclo alkane, and may include one or more selected from the group consisting of 1,1-bis(4,4'-hydroxyphenyl)cyclopentane, 1,1-bis(4,4'-hydroxyphenyl)cyclohexane, 1-methyl-1-(4-hydroxyphenyl)-4-(dimethyl-4-hydroxyphenyl)cyclohexane, 4-{1-[3-(4-hydroxyphenyl)-4-methylcyclohexyl]-1-methylethyl}phenol, 4,4-[1-methyl-4-(1-methylethyl)-1,3-cyclohexylidyl]bisphenol, and 2,2,2,2-tetrahydro-3,3,3,3-tetramethyl-1,1-spirobis-[1H]-indene-6,6-diol.

In order to obtain a compensation effect of the retardation compensator according to the present invention, it is preferable that a connection portion of the aromatic diol be formed of a polyarylate including 0.1 to 40 mol % of compound containing sulfur or sulfur oxide based on the total amount of the aromatic diol compound. In the case of where the amount of the compound containing sulfur or sulfur oxide is more than 40 mol % in the connection portion of aromatic diol, there are problems that the molecular weight of polyarylate is not easily controlled and solubility of a general solvent is poor. In addition, in the case of where the amount of the compound is less than 0.1 mol %, the absolute value of the retardation in the thickness direction is insignificantly increased.

Furthermore, a molecular weight regulator may be used to control the molecular weight of polyarylate. Examples of the molecular weight regulator may include a monovalent hydroxy compound, for example, a monovalent phenol compound such as phenol, o-cresol, m-cresol, p-cresol, o-ethyl phenol, m-ethyl phenol, p-ethyl phenol, o-propyl phenol, m-propyl phenol, p-propyl phenol, o-tert-butyl phenol, m-tert-butyl phenol, and p-tert-butyl phenol, and a monovalent alcohol such as methanol, ethanol, n-propanol, isopropanol, n-butanol, pentanol, hexanol, dodecyl alcohol, stearyl alcohol, benzyl alcohol, and phenethyl alcohol, and a monovalent (aromatic)carboxylic acid halide, for example, benzoyl chloride, acetic acid halide, propionic acid halide, octanoic acid halide, cyclohexylcarboxylic acid halide, toluic acid halide, p-tert-butylbenzoic acid halide, p-methoxyphenylacetic acid halide, and sulfonic acid chloride such as benzenesulfonyl chloride, toluenesulfonyl chloride, and methanesulfonyl chloride.

Furthermore, examples of alkali that is capable of being used during the polymerization of polyarylate may include alkali metal hydroxide such as sodium hydroxide and potassium hydroxide. It is preferable that the amount of alkali is 1.01 to 2 times as much as the mole number of the phenol hydroxyl group contained in divalent phenol and the molecular weight regulator. If the amount is less than 1.01 times, it is impossible to completely dissolve the divalent phenol compound. If the amount is more than 2 times, the phase separation is poor and the alkali compound remains in the polymer even after the polymerization product is purified. Accordingly, it is impossible to obtain polyarylate having excellent transparency. Additionally, in consideration of hydrolysis of aromatic dicarboxylic acid halide that occurs during the polymerization process, the amount of alkali is preferably set to be 1.01 to 2 times as much as the mole number of the phenol hydroxyl group in the present invention.

Additionally, it is required that an organic solvent which is used during the polymerization of polyarylate is capable of dissolving polyarylate while the solvent is not mixed with water. Examples of the organic solvent include methylene chloride, 1,2-dichloroethane, chloroform, carbon tetrachloride, chlorobenzene, 1,1,2,2,-tetrachloroethane, and a mixture thereof.

Furthermore, a phase transfer catalyst may be used in order to improve a polymerization rate of an interfacial polymerization during the polymerization of polyarylate, and examples of the phase transfer catalyst include a tetraalkylammonium ion, a tetraalkylphosphonium ion, and a nonionic surfactant.

The polymerization temperature of polyarylate during the polymerization is 0 to 40° C., and preferably 0 to 30° C., in considering that the hydrolysis of carboxylic acid halide is suppressed. After the polymerization is finished, stirring is stopped to remove a water layer, and washing is repeated using distilled water to remove salts, thereby producing polyarylate. In connection with this, it is preferable that a weight average molecular weight of polyarylate is 10,000 to 500,000.

In the negative C-type retardation compensator for the liquid crystal display according to the present invention, the polyarylate coating layer has the negative retardation in the thickness direction, and the absolute value of the retardation is 10 nm or more. That is, the polyarylate coating layer is directly applied on the base to control the thickness of the layer through a simple process without an additional stretching process, thereby providing various retardations.

It is preferable that the transparent base layer be a glass base layer.

Furthermore, the present invention provides a method of producing the negative C-type retardation compensator for the liquid crystal display. The method comprises 1) preparing a transparent base layer, and 2) forming a polyarylate coating layer by coating a polyarylate solution having a thio group or a sulfur oxide group in a polymer main chain on the transparent base layer of step 1.

In the method of producing the negative C-type retardation compensator for the liquid crystal display according to the present invention, it is preferable that the transparent base layer of step 1 is a glass base layer.

The transparent base layer may be reformed using a primer, a corona, plasma at a normal pressure, acid/base treatment, UV treatment, or reactive gas treatment in order to improve adhesion strength to the polyarylate coating layer.

The primer may be produced by dissolving an organic silane compound that is shown in the following Formula 2 in a solvent.

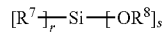

[Formula 2]

wherein,
r and s are integers of 0 to 4, and r+s=4, $R^7$ is a $C_1$ to $C_9$ alkyl group having one or more selected from the group consisting of an amine group, a hydroxyl group, and a thiol group; a $C_6$ to $C_{12}$ arylalkyl group having one or more selected from the group consisting of an amine group, a hydroxyl group, and a thiol group; or a $C_6$ to $C_{12}$ aryl group having one or more selected from the group consisting of an amine group, a hydroxyl group, and a thiol group, and $R^8$ is a $C_1$ to $C_9$ alkyl group, a $C_6$ to $C_{12}$ arylalkyl group, or a $C_6$ to $C_{12}$ aryl group.

Examples of the organic silane compound that is shown in the above Formula 2 include, but are not limited to one or more selected from the group consisting of 3-aminopropyl trimethoxy silane, 3-aminopropyl triethoxy silane, 3-thiopropyl trimethoxysilane, 3-thiopropyltriethoxy silane, 3-hydroxypropyltrimethoxysilane, and 3-hydroxypropyltriethoxysilane.

The primer solution may contain 0.1 to 99.9 parts by weight of the organic silane compound of Formula 3 based on 100 parts by weight of the solution, and a general solvent that is capable of dissolving the organic silane compound can be used. Examples of the solvent include, but are not limited to halogenated hydrocarbons such as methylene chloride, chloroform, carbon tetrachloride, dichloroethane, tetrachloroethane, and trichloroethane; ketones such as acetone, methylethylketone, methylisobutylketone, cyclohexanone, and cyclopentanone; esters such as ethyl acetate and methyl acetate; cycloethers such as tetrahydrofuran, dioxane, and dioxolane; aromatic hydrocarbons such as benzene, toluene, xylene, and methoxybenzene; alcohols such as methanol, ethanol, and ethylene glycol; an amide solvent such as dimethylformamide and dimethylacetamide; and ethers such as diethylether and dibutylether.

In the method of producing the negative C-type retardation compensator for the liquid crystal display according to the present invention, a polyarylate that has the thio group or the sulfur oxide group in the polymer main chain of step 2 may be represented by the above Formula 1.

In the method of producing the negative C-type retardation compensator for the liquid crystal display according to the present invention, the coating in step 2 is advantageous in that the thickness of the polyarylate coating layer is controlled during the coating to finely adjust the retardation in the thickness direction using a simple process and the retardation in the surface direction that occurs during the melt extrusion is minimized.

Examples of the coating method may include a spin coating process, a roll coating process, a flow coating process, a print process, a dip coat process, a gravure coating process, and a bar coating process. The coating method may be performed using a typical coating method.

In the polyarylate solution that is used to perform the coating, the concentration of polyarylate is not limited. However, the concentration of polyarylate is preferably 3 to 50 parts by weight, and more preferably 5 to 30 parts by weight, based on 100 parts by weight of the polyarylate coating solution in order to obtain the viscosity required during the coating.

The polyarylate is dissolved in the solvent, or water is removed from the polymerization solution after the washing and a predetermined solvent is added or the concentration is performed to produce the polyarylate solution.

Examples of the solvent that is used to produce the polyarylate coating solution are not limited as long as the solvent is capable of dissolving polyarylate, but include halogenated hydrocarbons such as methylene chloride, chloroform, carbon tetrachloride, dichloroethane, tetrachloroethane, and trichloroethane; ketones such as acetone, methylethylketone, methylisobutylketone, cyclohexanone, and cyclopentanone; esters such as ethyl acetate and methyl acetate; cycloethers such as tetrahydrofuran, dioxane, and dioxolane; aromatic hydrocarbons such as benzene, toluene, xylene, and methoxybenzene; alcohols such as methanol, ethanol, and ethylene glycol; an amide-based solvent such as dimethylformamide and dimethylacetamide; and ethers such as diethylether and dibutylether. The above-mentioned solvents may be used alone or a mixture thereof. The polyarylate solution may be mixed with various types of additives such as a UV stabilizer, a heat stabilizer, a plasticizer, an adhesion strength improving agent, and a filler if necessary.

In particular, it is preferable that the adhesion strength improving agent include an organic silane compound shown in the following Formula 3.

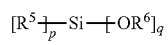

[Formula 3]

wherein,
p and q are integers of 0 to 4, and p+q=4, and
$R^5$ and $R^6$ are each independently a $C_1$ to $C_9$ alkyl group, a $C_6$ to $C_{12}$ arylalkyl group, or a $C_6$ to $C_{12}$ aryl group.

Examples of the organic silane compound that is shown in Formula 3 include, but are not limited to methylpropyl trimethoxy silane, methyltriethoxy silane, ethyltrimethoxysilane, 3-glycidoxypropyltrimethoxysilane, 3-hydroxypropyltrimethoxysilane, and 3-hydroxypropyltriethoxysilane.

It is preferable that the amount of the organic silane compound is 0.1 to 10.0 parts by weight based on 100 parts by weight of polyarylate.

The polyarylate solution is applied on the transparent base layer, and the solvent is dried. When the solvent is dried, the temperature may be slowly increased, or the solvent may be dried at a constant temperature.

Refractive indexes $n_x$, $n_y$, and $n_z$ of the dried sample are measured in respect to axes at 590 nm while the axis where the axis having the highest refractive index in the surface direction is set to an x-axis, the axis being perpendicular to the x-axis in the surface direction is set to an y-axis, and the axis being perpendicular to the x-y plane is set to a z-axis. The thickness of the coating layer may be measured to calculate the retardation in the thickness direction of the coat and the retardation in the surface direction using Equations 1 and 2.

$$R_{in} = (n_x - n_y) \times d$$ [Equation 2]

wherein,
$n_x$ is the refractive index which is the highest in the surface direction of the coat, $n_y$ is the refractive index of the direction perpendicular to the direction of $n_x$ in the surface direction of the coat, and d is the thickness of the coating layer.

In the method of producing the negative C-type retardation compensator for the liquid crystal display according to the present invention, the polyarylate coating layer of step 2 may be additionally subjected to hard coating treatment, reflection prevention treatment, and a predetermined treatment process to prevent sticking and to ensure desirable diffusion and anti-glare.

The hard coating treatment is performed to prevent the occurrence of defects. For example, in the hard coating treatment, a curable film that is formed of a curable resin and has excellent hardness and activity is formed on the surface of the transparent protective layer. Examples of the curable resin may include UV-curable resins such as silicone-based, urethane-based, acryl-based, and epoxy-based, and the treatment process may be performed using a known method.

Furthermore, the prevention of sticking is performed in order to prevent close contact between the adjacent layers.

Furthermore, the reflection prevention treatment may be performed using a known process for forming the reflection prevention layer to prevent reflection of light in respect to the surface of the polarizing plate.

Furthermore, the anti-glare treatment may be performed using a known process to prevent reduction in visibility of transmitted light due to the reflection of light in respect to the surface of the polarizing plate.

In the method of producing the negative C-type retardation compensator for the liquid crystal display according to the present invention, the thickness of the polyarylate coating layer of step 2 is preferably 0.1 to 100 μm, more preferably 0.1 to 50 μm, and most preferably 0.1 to 10 μm.

ADVANTAGEOUS EFFECTS

A negative C-type retardation compensator for liquid crystal displays according to the present invention includes polyarylate having a thio group or a sulfur oxide group in a polymer main chain thereof. Accordingly, the retardation compensator has an absolute value of negative retardation that is larger in a thickness direction than a retardation compensator which includes polyarylate having no thio or sulfur oxide group in a polymer main chain thereof even though the retardation compensator having the thio or sulfur oxide group and the retardation compensator having no thio or sulfur oxide group are the same as each other in thickness. Thereby, the negative C-type retardation compensator for liquid crystal displays according to the present invention can be desirably applied to the liquid crystal displays.

DESCRIPTION OF DRAWINGS

FIG. 1 is a graph showing a retardation in a thickness direction as a function of a thickness for retardation compensators of Examples 1 to 3 and Comparative example 1 according to the present invention.

MODE FOR INVENTION

A better understanding of the present invention may be obtained in light of the following Examples which are set forth to illustrate, but are not to be construed to limit the present invention.

Preparation Examples 1 to 3 and Comparative Preparation Example 1

Preparation of Polyarylate

Preparation Example 1

360 g of distilled water, 14.2 g of NaOH, 33.18 g of 2,2-bis(4-hydroxyphenyl)propane (BPA), 4.13 g of bis(4-hydroxyphenyl)sulfone (BPS), and 1.8 g of benzyltriethylammonium chloride were added to a reactor that is provided with a stirrer, and the temperature of the reactor was maintained at 25° C.

Separately, 32.8 g of aromatic dicarboxylic acid chloride mixture in which the same amounts of isophthalic acid chloride and terephthalic acid chloride were mixed with each other was dissolved in 440 g of methylene chloride. The mixture solution was added to the reactor in which the alkali aqueous solution was dissolved with stirring. After the stirring was performed for 1 hour, a hydrochloric acid was added and the washing was performed with distilled water. The washing was repeated until the conductivity of the water layer was 20 μs/cm or less, the resulting solution was poured onto methanol to perform phase separation of polymers, the polymers were filtered, and the drying was performed in a vacuum oven at 120° C. for 12 hours.

The weight average molecular weight and the glass transition temperature of the prepared polyarylate were evaluated using the following method.

(1) After the polymerization was finished, the polymerization solution was diluted with tetrahydrofuran for chromatography to have the content of 0.1 wt %, the measurement was performed by means of gel permeation chromatography using tetrahydrofuran for chromatography as an eluant, and the reduction was performed using a standard polystyrene weighing line to obtain the weight average molecular weight.

(2) The glass transition temperature was measured using DSC (differential scanning calorimeter). The thermal record of the sample was removed by increasing the temperature up to 300° C. at a heating rate of 10° C./min under a nitrogen atmosphere, and the temperature was reduced to room temperature and then increased to 300° C. in order to measure the glass transition temperature.

The weight average molecular weight of polyarylate was 115,000 and the glass transition temperature of polyarylate was 216° C. as the result of the above-mentioned analysis.

Preparation Example 2

300 g of distilled water, 13.3 g of NaOH, 27.6 g of 2,2-bis(4-hydroxyphenyl)propane (BPA), and 7.8 g of bis(4-hydroxyphenyl)sulfone (BPS) were added to a reactor that is provided with an agitator, and then dissolved. When the temperature of the reactor was maintained at 25° C., 1.8 g of benzyltriethylammonium chloride was added to the reactor, and stirred.

Separately, 30.7 g of aromatic dicarboxylic acid chloride mixture in which the same amounts of isophthalic acid chloride and terephthalic acid chloride were mixed with each other was dissolved in 440 g of methylene chloride. The mixture solution was added to the reactor in which the alkali aqueous solution was dissolved while the solution was stirred. After the stirring was performed for 1 hour, a hydrochloric acid was added to finish the reaction, and the washing was then performed with distilled water. The washing was repeated until the conductivity of the water layer was 20 μs/cm or less, the resulting solution was poured onto methanol to perform phase separation of polymers, the polymers were filtered, and the drying was performed in a vacuum oven at 120° C. for 12 hours.

The analysis was performed using the same method as Preparation example 1. As a result, the weight average molecular weight of polyarylate was 105,000 and the glass transition temperature of polyarylate was 218° C.

Preparation Example 3

290 g of distilled water, 11.3 g of NaOH, 29.3 g of 2,2-bis(4-hydroxyphenyl)propane (BPA), 7.8 g of bis(4-hydroxyphenyl)sulfone (BPS), and 1.8 g of benzyltriethylammonium chloride were added to a reactor that is provided with a stirrer, the temperature of the reactor was maintained at 25° C., and the stirring was performed.

Separately, 29.4 g of aromatic dicarboxylic acid chloride mixture in which the same amounts of isophthalic acid chloride and terephthalic acid chloride were mixed with each other was dissolved in 440 g of methylene chloride. The mixture solution was added to the reactor in which the alkali aqueous solution was dissolved while the solution was stirred. After the stirring was performed for 1 hour, a hydrochloric acid was added and the washing was repeated until the conductivity of the water layer was 20 μs/cm or less. After the washing was finished, the resulting solution was poured onto methanol to perform phase separation of polymers, the polymers were filtered, and the drying was performed in a vacuum oven at 120° C. for 12 hours.

The analysis was performed by using the same method as Preparation example 1. As a result, the weight average molecular weight of polyarylate was 84,000 and the glass transition temperature of polyarylate was 220° C.

Comparative Preparation Example 1

92 g of distilled water, 3.9 g of NaOH, 9.93 g of 2,2-bis(4-hydroxyphenyl)propane (BPA), and 0.48 g of benzyltriethylammonium chloride were added to a reactor that is provided with a stirrer, the temperature of the reactor was maintained at 25° C., and the stirring was performed.

Separately, 8.8 g of aromatic dicarboxylic acid chloride mixture in which the same amounts of isophthalic acid chloride and terephthalic acid chloride were mixed with each other was dissolved in 100 g of methylene chloride. The mixture solution was added to the alkali aqueous solution in which 2,2-bis(4-hydroxyphenyl)propane produced in advance was dissolved. After the polymerization was performed for 1 hour, a hydrochloric acid was added and the washing using distilled water was repeated until the conductivity of the water layer was 20 μs/cm or less. After the washing was finished, the resulting solution was added to methanol to perform phase separation of polymers, the polymers were filtered, and the drying was performed in a vacuum oven at 120° C. for 12 hours.

The analysis was performed by using the same method as Preparation example 1. As a result, the weight average molecular weight of polyarylate was 98,000 and the glass transition temperature of polyarylate was 200° C.

Examples 1 to 6 and Comparative Example 1

Production of the Polyarylate Film

Example 1

1.00 g of polyarylate that was prepared in Preparation example 1 was slowly added to 9.00 g of 1,2-dichloroethane to be dissolved, and then stirred at 30° C. for 24 hours to produce a homogeneous solution. The filtration was performed using the filter having the size of 0.45 μm to remove insoluble substances and dust, thereby 10 wt % of coating solution was produced. The coating solution was poured on glass to be applied using a bar, the position of which was controlled so that the interval between the glass and the bar was 30 μm, at a speed of 0.6 m/min. The drying was performed at room temperature for 10 min, and the additional drying was performed in the oven at 130° C. for 60 min to remove the solvent. The position of the bar was controlled so that the intervals between the glass and the bar were 40 μm and 60 μm to produce the samples having the different polymer coat thicknesses.

The retardation in the thickness direction and the retardation in the surface direction of the polymer coat were measured using the following method.

The retardation in the thickness direction was measured using Kobra21-ADH (commercial name) that is manufactured by Oji Scientific Instrument Co. Refractive indexes $n_x$, $n_y$, and $n_z$ were measured in respect to axes at 590 nm while the axis having the highest refractive index in the surface direction was set to an x-axis at 590 nm, the axis which was perpendicular to the x-axis in the surface direction was set to an y-axis, and the axis which was perpendicular to the x-y plane was set to a z-axis. The thickness of the coating layer was measured to obtain the refractive indexes $n_x$, $n_y$, and $n_z$ in respect to the axes. The retardation in the thickness direction of the coat and the retardation in the surface direction of the coat were calculated using Equations 1 and 2.

The results are described in the following Table 1.

Example 2

The retardation in the thickness direction of the coat and the retardation in the surface direction of the coat were calculated through the same procedure as Example 1, except that polyarylate of Preparation example 2 was used instead of polyarylate of Preparation example 1. The intervals between the bar and the glass were set to 40 μm, 50 μm, and 70 μm.

The results are described in the following Table 1.

Example 3

The retardation in the thickness direction of the coat and the retardation in the surface direction of the coat were calculated through the same procedure as Example 1, except that polyarylate of Preparation example 3 was used instead of polyarylate of Preparation example 1. The intervals between the bar and the glass were set to 30 μm, 50 μm, and 60 μm.

The results are described in the following Table 1.

Example 4

The polyarylate film was produced using the glass base material, the surface of which was reformed, and the adhesion strength improving agent.

5 wt % of 3-aminopropyl(triethoxy)silane (APES) solution that was diluted with 1-propanol at room temperature was applied on the surface of glass, dried at normal temperature for 3 min, and cured at 60° C. for 3 min by heating.

The polyarylate that was prepared in Preparation example 1 was dissolved in 1,2-dichloroethane to prepare 10 wt % of coating solution, and 5 g of 3-glycidoxypropyltrimethoxysilane (GPMS) was added thereto based on 100 g of polyarylate to produce a polymer coating solution.

The polymer coating solution was applied on the glass in which the primer layer was treated using a bar, the position of which was controlled so that the interval between the glass and the bar was 10 μm, at a speed of 0.6 m/min. The drying was performed at room temperature for 10 min, and the additional drying was performed in the oven at 130° C. for 60 min to remove the solvent. The position of the bar was controlled so that the intervals between the glass and the bar were 20 μm and 40 μm to produce the samples having the different polymer coat thicknesses.

The retardation in the thickness direction and the retardation in the surface direction of the polymer coat were measured by using the method described in Example 1, and the calculation was performed.

The results are described in the following Table 1.

Example 5

The retardation in the thickness direction of the coat and the retardation in the surface direction of the coat were calculated through the same procedure as Example 4, except that the glass base material where the surface was not reformed was used instead of the glass base material where the surface was reformed.

The results are described in the following Table 1.

Example 6

The retardation in the thickness direction of the coat and the retardation in the surface direction of the coat were calculated through the same procedure as Example 4, except that the glass base material where the surface was not reformed was used instead of the glass base material where the surface was reformed and the amount of 3-glycidoxypropyltrimethoxysilane was 10 g instead of 5 g based on 100 g of polyarylate.

The results are described in the following Table 1.

Comparative Example 1

The retardation in the thickness direction of the coat and the retardation in the surface direction of the coat were calculated through the same procedure as Example 1, except that polyarylate of Comparative preparation example 1 was used instead of polyarylate of Preparation example 1. The intervals between the bar and the glass were set to 20 μm, 40 μm, and 60 μm.

The results are described in the following Table 1.

TABLE 1

| | Thickness (μm) | Retardation in surface direction (nm) | Retardation in thickness direction (nm) | Retardation in according to thickness (nm/μm) |
|---|---|---|---|---|
| Example 1 | 3.0 | 0 | −74 | −24.70 |
| | 4.2 | 0 | −97 | −23.10 |
| | 5.6 | 0 | −125 | −22.30 |
| Example 2 | 3.5 | 0 | −101 | −28.90 |
| | 4.8 | 0 | −125 | −26.00 |
| | 6.2 | 0 | −150 | −24.20 |
| Example 3 | 2.7 | 0 | −86 | −31.90 |
| | 4.2 | 0 | −130 | −31.00 |
| | 5.9 | 0 | −170 | −28.80 |
| Example 4 | 1.2 | 0 | −24 | −20.00 |
| | 2.1 | 0 | −36 | −17.10 |
| | 5.8 | 0 | −93 | −16.00 |
| Example 5 | 1.1 | 0 | −26.22 | −23.62 |
| | 2.2 | 0 | −50.7 | −22.72 |
| | 5.7 | 0 | −105 | −18.40 |
| Example 6 | 1.0 | 0 | −22 | −22.00 |
| | 2.0 | 0 | −38 | −19.00 |
| | 6.2 | 0 | −110 | −17.70 |
| Comparative example 1 | 1.9 | 0 | −45 | −23.70 |
| | 4.1 | 0 | −84 | −20.50 |
| | 5.7 | 0 | −115 | −20.20 |

As shown in Table 1, the retardation compensators (Examples 1 to 6) according to the present invention which includes polyarylate having a thio group or a sulfur oxide group in a polymer main chain thereof have an absolute value of negative retardation which is larger in a thickness direction than a retardation compensator (Comparative example 1) which includes polyarylate having no thio or sulfur oxide group in a polymer main chain thereof.

To be more specific, with reference to FIG. 1 which illustrates a retardation in a thickness direction as a function of a thickness for the retardation compensators of Examples 1 to 3 and Comparative example 1 according to the present invention, the absolute value of the retardation in the thickness direction is higher in Examples 1 to 3 of the present invention than in Comparative example 1 even though the retardation compensators of Examples 1 to 3 and Comparative example 1 have the same thickness. Furthermore, the absolute value of the retardation in the thickness direction of the retardation compensator is increased as the content of the thio group or the sulfur oxide group contained in polyarylate is increased.

Experimental Example

Evaluation of Delamination Strength

In order to evaluate the delamination strength of the retardation compensator which includes polyarylate having the thio group or the sulfur oxide group in the polymer main chain thereof according to the present invention, the following test was performed.

The polyarylate films that were produced in Examples 4 to 6 were subjected to the delamination test using a Nichiban tape which includes 100 lattices having the size of 1 mm×1 mm.

The results are described in the following Table 2.

TABLE 2

|  | Thickness(μm) | Delamination test |
|---|---|---|
| Example 4 | 1.2 | ○ |
|  | 2.1 | ○ |
|  | 5.8 | ○ |
| Example 5 | 1.1 | Δ |
|  | 2.2 | Δ |
|  | 5.7 | Δ |
| Example 6 | 1.0 | Δ |
|  | 2.0 | Δ |
|  | 6.2 | Δ |

✕ X: All of 100 lattices are delaminated by the tape
Δ: 20 lattices are delaminated
○: No delamination As shown in Table 2, in the case of the retardation compensator that includes the glass base material having the reformed surface and the adhesion strength improving agent of the retardation compensators according to the present invention (Example 4), the delamination does not occur. However, in the case of the retardation compensator that includes the glass base material having the surface which is not reformed and the adhesion strength improving agent (Examples 5 and 6), the small number of lattices are delaminated.

The invention claimed is:

1. A negative C-type retardation compensator for a liquid crystal display comprising:
   1) a transparent base layer; and
   2) a polyarylate coating layer which is layered on the transparent base layer and has a thio group or a sulfur oxide group in a polymer main chain thereof,
   wherein the polyarylate having the thio group or the sulfur oxide group in the polymer main chain is represented by Formula 1:

[Formula 1]

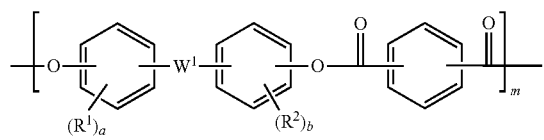

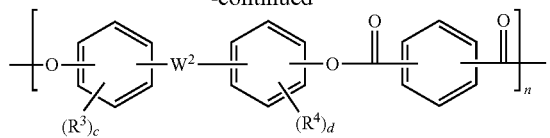

wherein,
a, b, c, and d are each independently an integer of 0, or 1 to 4,
m and n are molar fractions, m+n=1, $0 \leq m \leq 1$, and $0.001 \leq n \leq 0.4$,
$R^1$ and $R^2$ are each independently a halogen, a nitrile group, a $C_1$ to $C_{12}$ alkoxy group, a $C_6$ to $C_{12}$ arylalkyl group, a $C_6$ to $C_{12}$ aryl group, or a $C_1$ to $C_{12}$ acyl group,
$R^3$ and $R^4$ are each independently a halogen, a nitrile group, a $C_1$ to $C_{12}$ alkyl group, a $C_1$ to $C_{12}$ alkoxy group, a $C_6$ to $C_{12}$ arylalkyl group, a $C_6$ to $C_{12}$ aryl group, or a $C_1$ to $C_{12}$ acyl group,
$W^1$ is a direct bond, a $C_1$ to $C_{30}$ alkylidene group, a $C_2$ to $C_{30}$ alkylene group, a $C_3$ to $C_{30}$ cycloalkylidene group, a $C_3$ to $C_{30}$ cycloalkylene group, a $C_2$ to $C_{30}$ phenyl-substituted alkylene group, a carbonyl group, NR, $PO_2$, an oxygen, wherein R is a hydrogen, a $C_1$ to $C_{12}$ alkyl group, a $C_6$ to $C_{12}$ arylalkyl group, or a $C_6$ to $C_{12}$ aryl group,
$W^2$ is a thio group or a sulfur oxide group,
wherein in the polyarylate coating layer, a retardation in a thickness direction which is defined by Equation 1 is negative, and an absolute value of the retardation is 10 nm or more:

$$R_{th} = \left(n_z - \frac{n_x + n_y}{2}\right) \times d \quad \text{[Equation 1]}$$

wherein,
$n_x$ is a refractive index which is the highest in a surface direction of the coating layer,
$n_y$ is the refractive index of the direction perpendicular to the direction of $n_x$ in the surface direction of the coating layer,
$n_z$ is the refractive index of the direction perpendicular to an $n_{xy}$ plane, and
d is a thickness of the coating layer.

2. The negative C-type retardation compensator for a liquid crystal display according to claim 1, wherein $W^2$ of Formula 1 is the thio group, the sulfinyl group, or the sulfonyl group.

3. The negative C-type retardation compensator for a liquid crystal display according to claim 1, wherein the polyarylate having the thio group or the sulfur oxide group in the polymer main chain thereof is produced by polycondensating aromatic diol and aromatic dicarboxylic acid, or aromatic diol and aromatic dicarboxylic acid halide.

4. The negative C-type retardation compensator for a liquid crystal display according to claim 3, wherein the aromatic dicarboxylic acid or the aromatic dicarboxylic acid halide is selected from the group consisting of terephthalic acid, isophthalic acid, dibenzoic acid, naphthalene dicarboxylic acid, 4,4'-methylenebisbenzoic acid, 1,2-bis(4-hydroxycarbonylphenyl)ethane, 2,2-bis(4-hydroxycarbonylphenyl)propane, 4,4'-oxo-bis(benzoic acid), bis(4-hydroxycarbonylphenyl)sulfide, bis(4-hydroxycarbonylphenyl)sulfone, aromatic dicarboxylic acid in which aromatic groups thereof are substituted by a $C_1$ to $C_2$ alkyl group or a halogen group, and a mixture thereof.

5. The negative C-type retardation compensator for a liquid crystal display according to claim 3, wherein the aromatic dicarboxylic acid or the aromatic dicarboxylic acid halide is a mixture of 10 to 90 mol % of terephthalic acid halide and 90 to 10 mol % of isophthalic acid halide.

6. The negative C-type retardation compensator for a liquid crystal display according to claim 3, wherein the aromatic diol is one or more selected from the group consisting of bis(4-hydroxyphenyl)methane, 2,2-bis(4-hydroxyphenyl)propane (BPA), 2,2-bis(4-hydroxyphenyl)ethane, 2,2-bis(4-hydroxy-3-methylphenyl)propane, 2,2-bis(4-hydroxyphenyl)heptane, 2,2-bis(4-hydroxy-3,5-dichlorophenyl)propane, 2,2-bis(4-hydroxy-3,5-dibromophenyl)propane, bis(4-hydroxyphenyl)phenylmethane, 4,4-dihydroxyphenyl-1,1-m-diisopropylbenzene, 4,4-dihydroxyphenyl-9,9-fluorene, 2,2-bis(4-hydroxyphenyl)fluorene (BHPF), 9,9-bis(3,5-dimethyl-4-hydroxyphenyl)fluorene (BDMPF), 9,9-bis(3,5-dibromo-4-hydroxyphenyl)fluorene (BFBPF), 1,1-bis(4,4'-hydroxyphenyl)cyclopentane, 1,1-bis(4,4'-hydroxyphenyl)cyclohexane, 1-methyl-1-(4-hydroxyphenyl)-4-(dimethyl-4-hydroxyphenyl)cyclohexane, 4-{1-[3-(4-hydroxyphenyl)-4-methylcyclohexyl]-1-methylethyl}phenol, 4,4-[1-methyl-4-(1-methylethyl)-1,3-cyclohexylidyl]bisphenol, and 2,2,2,2-tetrahydro-3,3,3,3-tetramethyl-1,1-spirobis-[1H]-indene-6,6-diol.

7. The negative C-type retardation compensator for a liquid crystal display according to claim 1, wherein the transparent base layer is a glass base layer.

8. The negative C-type retardation compensator for a liquid crystal display according to claim 1, wherein the polyarylate coating layer is an unstretched film.

9. A liquid crystal display comprising:
the negative C-type retardation compensator for a liquid crystal display of claim 1.

* * * * *